(12) United States Patent
Hsu et al.

(10) Patent No.: US 6,809,784 B2
(45) Date of Patent: Oct. 26, 2004

(54) COLOR FILTER FOR A REFLECTIVE TYPE LCD AND METHOD FOR MANUFACTURING THE SAME

(75) Inventors: Jui-Mei Hsu, Tainan (TW); Chia-Hui Pai, Taichung (TW); Chiu-Hui Ho, Ping-Ho Village (TW)

(73) Assignee: Chi Mei Optoelectronics Corp., Tainan (TW)

( * ) Notice: Subject to any disclaimer, the term of this patent is extended or adjusted under 35 U.S.C. 154(b) by 42 days.

(21) Appl. No.: 10/180,725

(22) Filed: Jun. 26, 2002

(65) Prior Publication Data

US 2003/0007111 A1 Jan. 9, 2003

(30) Foreign Application Priority Data

Jul. 3, 2001 (TW) ........................................ 90116240 A

(51) Int. Cl.[7] ............................................. G02F 1/1335
(52) U.S. Cl. ........................................... 349/106; 430/7
(58) Field of Search ................................ 349/106, 187; 430/7

(56) References Cited

U.S. PATENT DOCUMENTS

| | | | | | |
|---|---|---|---|---|---|
| 5,101,289 A | * | 3/1992 | Takao et al. | ................ | 349/106 |
| 5,212,575 A | * | 5/1993 | Kojima et al. | ............... | 349/147 |
| 6,392,729 B1 | * | 5/2002 | Izumi et al. | ................ | 349/110 |

* cited by examiner

*Primary Examiner*—Robert H. Kim
*Assistant Examiner*—Richard H Kim
(74) *Attorney, Agent, or Firm*—Senniger Powers

(57) ABSTRACT

The present invention relates to a method for manufacturing a color filter. The method utilizes the dry film technology, photomasks, exposure and development process to form the black frame, the red pixel array and the green pixel array on the substrate. Finally, the blue pixel array is formed on the substrate by utilizing a back mask, exposure from a backside of the substrate and development process. Therefore, the red pixel array and the green pixel array on the substrate can cut the UV exposure from backside. In the exposure process, only the blue pixel array in a recess area exposes under the UV light. After the development process, the blue pixel array is formed on the substrate.

9 Claims, 3 Drawing Sheets

COLOR FILTER FOR A REFLECTIVE TYPE LCD AND METHOD FOR MANUFACTURING THE SAME

BACKGROUND OF THE INVENTION

1. Field of the Invention

The present invention relates to a color filter and a method for manufacturing the color filter, more particularly, to a color filter and a method for manufacturing the color filter of reflective type LCD.

2. Description of the Related Art

Referring to FIG. 1, the conventional color filter 1 comprises black frame (BF) 11, a red pixel array (R) 12, a green pixel array (G) 13, a blue pixel array (B) 14 and a substrate 15. The color filter 1 for reflective type LCD is manufactured by dry film technology. Firstly, the black frame 11 is formed on the substrate 15. Then in sequence, the red pixel array 12, the green pixel array 13 and the blue pixel array 14 are formed on the substrate 15. The black frame 11, the red pixel array 12, the green pixel array 13 and the blue pixel array 14 must be formed on the substrate 15 by utilizing photomasks, exposure and development process to form the pattern of each pixel array on the substrate 15. Therefore, four photomasks are needed in the process of manufacturing the color filter 1. However, the photomask is expensive. If the number of the photomask can be lessened, the cost of the color filter will be reduced.

The red pixel array 12 is adjacent to the green pixel array 13 and the blue pixel array 14 in sequence. Because of the limit of the positioning precision of the exposure instrument, there are protrusions 16 on the adjacent area. For example, when the green pixel array 13 is formed on the substrate, the protrusion 16 is formed on the adjacent area, covering the partial edge of the red pixel array 12. Similarly, the adjacent areas between the blue pixel array 14 and the red pixel array 12 and between the blue pixel array 14 and the green pixel array 13 have the protrusions. The protrusion may easily interfere the display performance of the LCD product.

Furthermore, when the red pixel array 12, the green pixel array 13 and the blue pixel array 14 are formed on the substrate 15, the pixel array will have pinhole, if there are particles in the pixel array. The pinhole will be a white spot in the screen of the LCD, and will be a defect of the LCD product.

Therefore, it is necessary to provide an innovative and progressive color filter and method for manufacturing the same so as to solve the above problem.

SUMMARY OF THE INVENTION

One objective of the present invention is to provide a method for manufacturing a color filter. The method utilizes the dry film technology, photomasks, exposure and development process to form the black frame, the red pixel array and the green pixel array on the substrate. The blue pixel array is formed on the substrate by utilizing a back mask, exposure process from the backside of the substrate and development process. Therefore, the red pixel array and the green pixel array on the substrate can cut the UV exposure from backside. In the exposure process, only the blue pixel array in a recess area is exposed to the UV light. After the development process, the blue pixel array is formed on the substrate. Because the photomask is more expensive than the back mask, the method of the invention can reduce the cost of the LCD product by using a back mask instead of a photomask.

According to the method of the invention, the red pixel array and the green pixel array provides photomask function to shield UV from the back side of the substrate such that the blue pixel array is formed on the substrate. The problem of positioning precision and the error caused by the photomask on the prior art can be solved. Therefore, both a first adjacent area between the blue pixel array and the green pixel array and a second adjacent area between the blue pixel array and the red pixel array have flat surface without protrusions so as to have better quality.

Furthermore, according to the method of the invention, the blue pixel array is formed on the substrate by a back mask and exposure from backside. Therefore, the blue film can fill the pinhole caused by the particles on the red pixel array and the green pixel array so that the LCD product does not have the white spot caused by the pinhole. The yield of the LCD product can be improved.

DETAILED DESCRIPTION OF THE INVENTION

Figure 2:
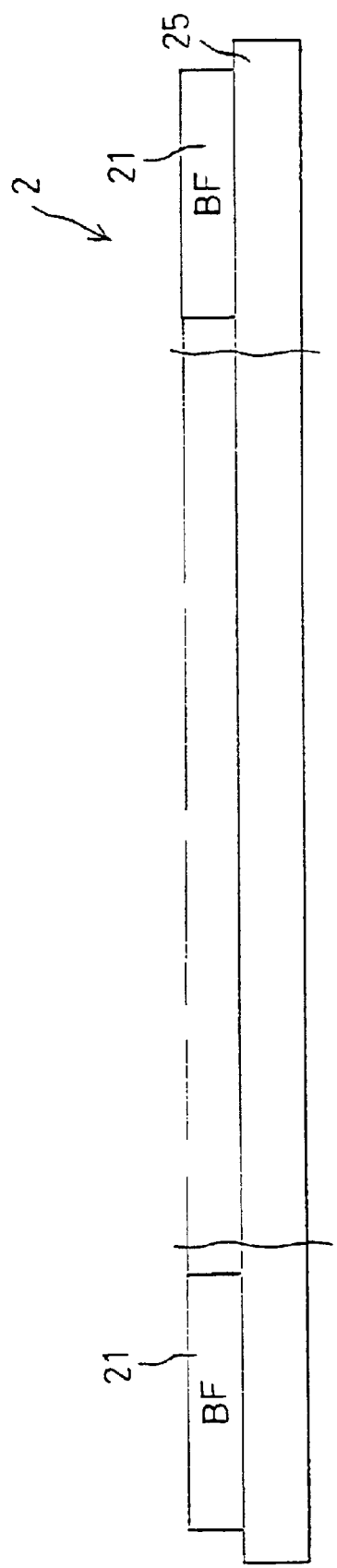
FIG. 2 shows a cross-section view illustrating the black frame formed on the substrate, according to the method of the invention.

According to the invention, a color filter 2 for reflective type LCD is manufactured by the dry film technology. Referring to FIG. 2, a first color layer 21 is formed on a substrate 25 by utilizing a photomask disposed above an upper side of the substrate and utilizing the exposure and development process. Usually the first color layer 21 is black frame (BF).

Figure 3:
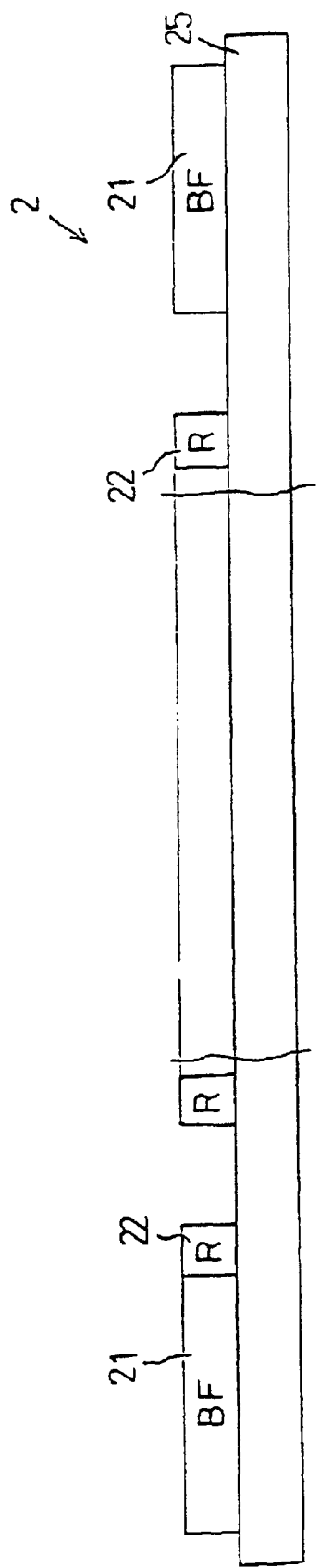
FIG. 3 shows a cross-section view illustrating the red pixel array formed within the black frame, according to the method of the invention.

Referring to FIG. 3, in sequence the second color layer 22 is formed on the substrate 25 by utilizing a photomask disposed above the upper side of the substrate and utilizing the exposure and development process. The second color layer can be a red pixel array (R) 22 and is formed within the black frame 21.

Figure 4:
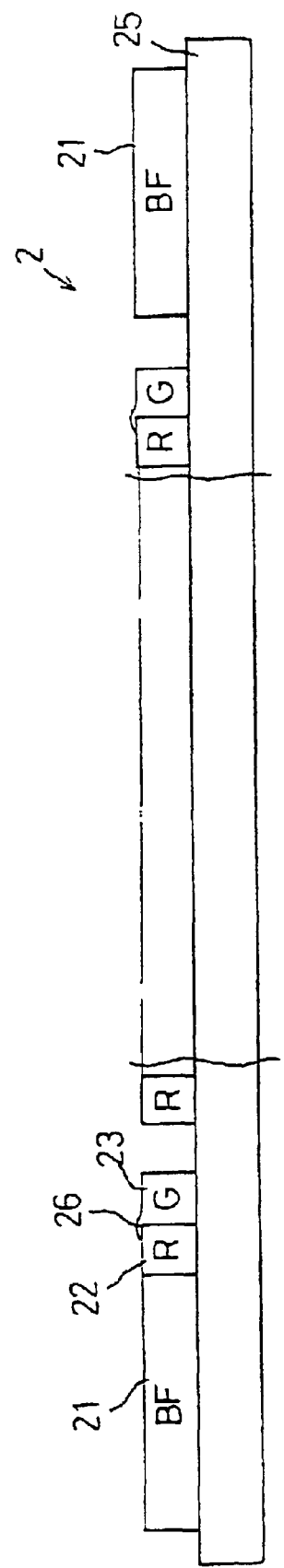
FIG. 4 shows a cross-section view illustrating the green pixel array formed within the black frame, according to the method of the invention.

Referring to FIG. 4, similarly, a positive photomask, the exposure and development process are utilized to form a third color layer 23 on the substrate 25. The third color layer 23 can be a green pixel array (G), and is formed within the black frame 21 and is adjacent to the red pixel array 22. Because of the limit of the positioning precision of the exposure instrument, the green pixel array 23 has the protrusion 26 formed on the adjacent area, covering the partial edge of the red pixel array 22.

Figure 5:
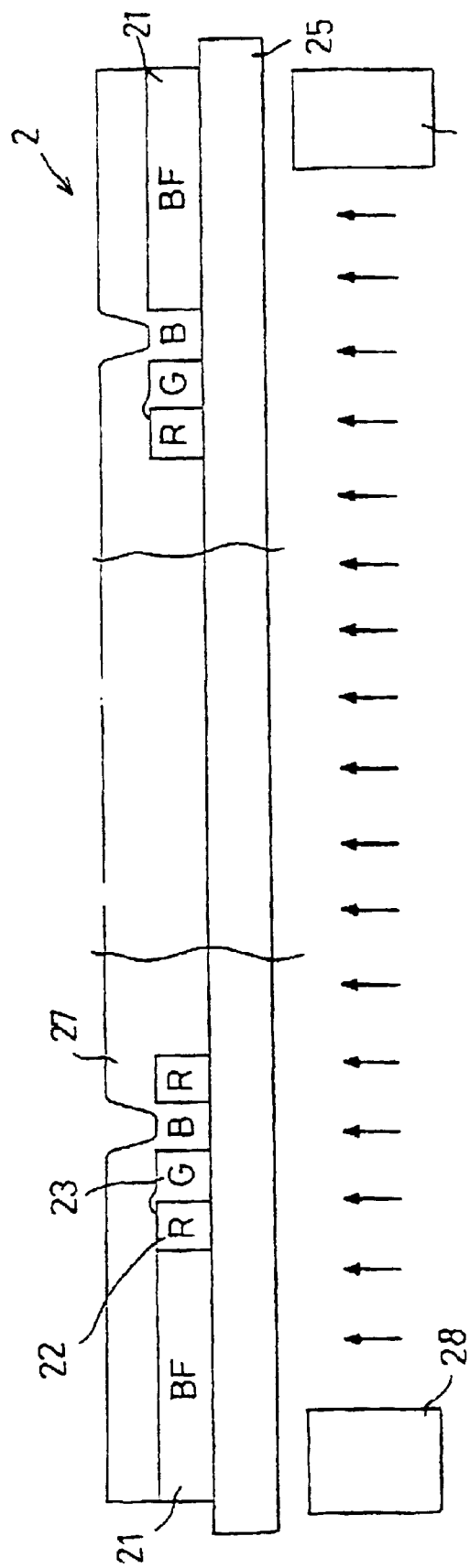
FIG. 5 shows a cross-section view illustrating the blue pixel array formed within the black frame, according to the method of the invention.
Figure 6:
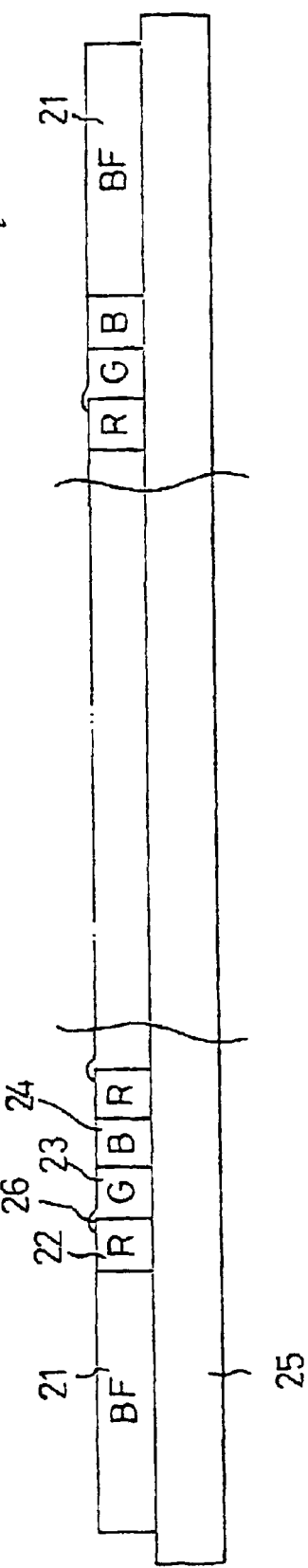
FIG. 6 shows a cross-section view of the color filter according to the invention.

Referring to FIG. 5 and FIG. 6, a fourth color layer 24 such as blue color film is formed on the substrate 25. The blue color film 27 covers on the red pixel array 22 and the green pixel array 23 and fills the recess area on the substrate 25. A back mask 28 is positioned under a backside of the substrate 25. The exposure and development process are performed from the backside of the substrate 25 to form the blue pixel array 24 on the substrate 25. In the meantime, the red pixel array 22 and the green pixel array 23 on the substrate 25 can cut the UV exposure from backside, and have the effect of photomask such that the blue color film 27 on the black frame 21, the red pixel array 22, and the green pixel array 23 is not exposed. Accordingly, in the exposure process, only the blue pixel array 24 exposes under the UV light. After the development process, the blue color film 27 on the black frame 21, the red pixel array 22, and the green pixel array 23 are removed, and the blue pixel array 24 is formed on the substrate 25.

According to the invention, the back mask 28 is utilized to form the blue pixel array 24 on the substrate 25, and a photomask for forming the blue pixel array 24 becomes unnecessary. Because the cost for designing the photomask and for positioning the photomask is more expensive than that of the back mask, the method of the invention can reduce the cost of the LCD product by using a back mask instead of a photomask.

Figure 1:
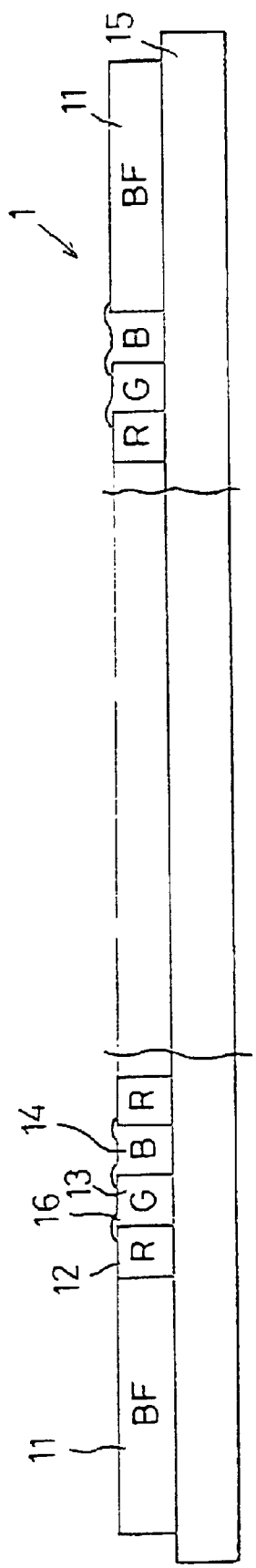
FIG. 1 shows a cross-section view of the conventional color filter.

Referring to FIG. 6, according to the method of the invention, because the blue pixel array 24 is formed on the substrate 25 by utilizing the back mask 28, the problem of positioning precision and the error caused by the photomask can be solved. Therefore, both a first adjacent area between the blue pixel array 24 and the green pixel array 23 and a second adjacent area between the blue pixel array 24 and the red pixel array 22 have flat surface without protrusions. Compared to the conventional color filter 1 shown in FIG. 1, the color filter 2 of the invention has protrusion 26 only on the adjacent area between the red pixel array 22 and the green pixel array 23, and the surface of the other adjacent area is flat. The color filter 2 of the invention has better flat surface, and has better display quality.

Referring to FIG. 5 again, according to the method of the invention, because the blue pixel array 24 is formed on the substrate 25 by a back mask 28 and exposure process from backside, the exposure area of the blue color film 27 comprises the area of the red pixel array 22 and the green pixel array 23. Therefore, the blue color film 27 can fill the pinhole caused by the particles on the red pixel array 22 and the green pixel array 23 so that the LCD product does not have the white spot caused by the pinhole. The yield of the LCD product can be improved.

According to the above method of the invention, normally, the first order of the method is to have the black frame formed on the substrate, then in sequence to have the red pixel array, the green pixel array and the blue pixel array formed on the substrate. However, according to the method of the invention, the sequence for forming the pixel array on the substrate can be changed. For example, the red pixel array can firstly be formed on the substrate, then the black frame, the green pixel array and the blue pixel array be formed on the substrate in order. The red pixel array can firstly be formed on the substrate, and then the green pixel array, the black frame and the blue pixel array be formed on the substrate in order. Therefore, the sequence of forming the black frame, the red pixel array and the green pixel array on the substrate can be changed.

While an embodiment of the present invention has been illustrated and described, various modifications and improvements can be made by those skilled in the art. The embodiment of the present invention is therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. A method for manufacturing a color filter of a reflective type LCD, the color filter manufactured by utilizing dry film technology, the method comprising the steps of:

(a) forming a plurality of first color layers on a substrate, in which the substrate is exposed and developed to form the first color layers on a first side of the substrate;

(b) forming a plurality of second color layers on the substrate, in which the substrate is exposed and developed to form the second color layers on the first side of the substrate;

(c) forming a plurality of third color layers on the substrate, in which the substrate is exposed and developed to form the third color layers on the first side of the substrate; and (d) forming a plurality of fourth color layers on the substrate, in which the substrate is exposed through an exposure area defined by a back mask disposed at a second side opposite to the first side, and then developed to form the fourth color layers on the substrate, wherein at least two of the first color layers, the second layers and the third color layers fall within the exposure area and act as an inherent mask.

2. The method according to claim 1, wherein the first color layers comprise black frames, the second color layers comprise red pixel arrays formed within the black frames, the third color layers comprise green pixel arrays formed within the black frames and adjacent to the red pixel arrays, and the fourth color layers comprise blue pixel arrays formed within the black frames and adjacent to the red pixel arrays and the green pixel arrays.

3. The method according to claim 1, wherein the first color layers comprise red pixel arrays, the second color layers comprise black frames and the red pixel arrays is formed within the black frames, the third color layers comprise green pixel arrays formed within the black frames and adjacent to the red pixel arrays, and the fourth color layers comprise blue pixel arrays formed within the black frames and adjacent to the red pixel arrays and the green pixel arrays.

4. The method according to claim 1, wherein the first color layers comprise red pixel arrays, the second color layers comprise green pixel arrays adjacent to the red pixel arrays, the third color layers comprise black frames and the red pixel arrays and the green pixel arrays are formed within the black frames, and the fourth color layers comprise blue pixel arrays formed within the black frames and adjacent to the red pixel arrays and the green pixel arrays.

5. A method for manufacturing a color filter of a reflective type LCD, the color filter manufactured by utilizing dry film technology, the method comprising the steps of:

(a) forming a plurality of first color layers on a substrate, in which the substrate is exposed and developed to form the first color layers on a first side of the substrate;

(b) forming a plurality of second color layers on the substrate, in which the substrate is exposed and developed to form the second color layers on the first side of the substrate;

(c) forming a plurality of third color layers on the substrate, in which the substrate is exposed and developed to form the third color layers on the first side of the substrate; and (d) forming a plurality of fourth color layers on the substrate, in which, the substrate is exposed through an exposure area defined by a back mask disposed at a second side opposing to the first side, and then developed to form the fourth color layers on the substrate, wherein the first color layers, the second layers and the third color layers fall within the exposure area and act as an inherent mask.

6. The method according to claim 5, wherein the first color layers comprise black frames, the second color layers comprise red pixel arrays formed within the black frames, the third color layers comprise green pixel arrays formed within the black frames and adjacent to the red pixel arrays, and the fourth color layers comprise blue pixel arrays formed within the black frames and adjacent to the red pixel arrays and the green pixel arrays.

7. The method according to claim 5, wherein the first color layers comprise red pixel arrays, the second color layers comprise black frames and the red pixel arrays are formed within the black frames, the third color layers comprise green pixel arrays formed within the black frames and adjacent to the red pixel arrays, and the fourth color layers comprise blue pixel arrays formed within the black frames and adjacent to the red pixel arrays and the green pixel arrays.

8. The method according to claim 5, wherein the first color layers comprise red pixel arrays, the second color layers comprise green pixel arrays adjacent to the red pixel arrays, the third color layers comprise black frames and the red pixel arrays and the green pixel arrays are formed within the black frames, and the fourth color layers comprise blue pixel arrays formed within the black frames and adjacent to the red pixel arrays and the green pixel arrays.

9. A method for manufacturing a color filter of a reflective type LCD, the color filter manufactured by utilizing dry film technology, the method comprising the steps of:

(a) forming a plurality of first color layers on a substrate, in which the substrate is exposed and developed to form the first color layers on a first side of the substrate, and the exposed and developed first color layers is adapted to screen a UV light;

(b) forming a plurality of second color layers on the substrate, in which the substrate is exposed and developed to form the second color layers on the first side of the substrate, and the exposed and developed second color layers is adapted to screen a UV light;

(c) forming a plurality of third color layers on the substrate, in which the substrate is exposed and developed to form the third color layers on the first side of the substrate, and the exposed and developed third color layers is adapted to screen a UV light; and (d) forming a plurality of fourth color layers on the substrate, in which, the substrate is exposed by the UV light through an exposure area of a back mask at a second side opposite to the first side, and then developed to form the fourth color layers on the substrate, wherein the first color layers, the second layers and the third color layers fall within the exposure area and act as an inherent mask.

\* \* \* \* \*